United States Patent [19]

Clapp et al.

[11] 4,023,627

[45] May 17, 1977

[54] AIR SHUT-OFF TOOL

[75] Inventors: John Madison Clapp, Sayre, Pa.; Reginald William Pauley, Belle Mead, N.J.

[73] Assignee: Ingersoll-Rand Company, Woodcliff Lake, N.J.

[22] Filed: Sept. 29, 1975

[21] Appl. No.: 617,320

[52] U.S. Cl. .................................... 173/12; 91/59; 91/435; 91/458

[51] Int. Cl.[2] ...................... B23Q 5/06; F01C 21/12

[58] Field of Search ...................... 91/59, 435, 458; 173/12

[56] References Cited

UNITED STATES PATENTS

| | | | |
|---|---|---|---|
| 1,414,168 | 4/1922 | Bayles et al. | 91/59 |
| 3,406,762 | 10/1968 | Kramer | 91/59 X |
| 3,473,439 | 10/1969 | Bratt | 91/59 |
| 3,608,131 | 9/1971 | Hornschuch et al. | 91/59 X |
| 3,656,560 | 4/1972 | Chatterfeld et al. | 173/12 |

*Primary Examiner*—Irwin C. Cohen

*Attorney, Agent, or Firm*—Walter C. Vliet

[57] ABSTRACT

This invention relates to power tools and more particularly to an air-operated power tool commonly used for automotive or other assembly operations for installing threaded fasteners. The device of this invention shuts off the power tool as it approaches the stall condition. Motor rotation is sensed by transferring a small mass of air in proportion to the speed of the motor but independent of the air expanded to operate the motor. The air transferred is utilized to create a signal which through an air-operated valve shuts the power tool off when the speed is reduced below a predetermined amount as when the torquing cycle is nearing completion.

8 Claims, 6 Drawing Figures

FIG. 1
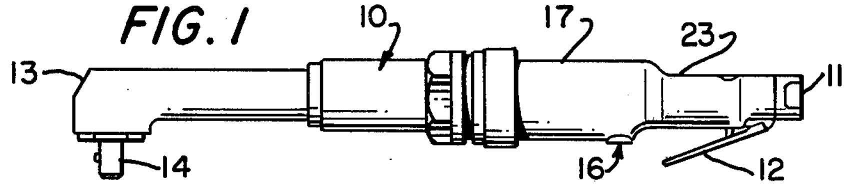
FIG. 2
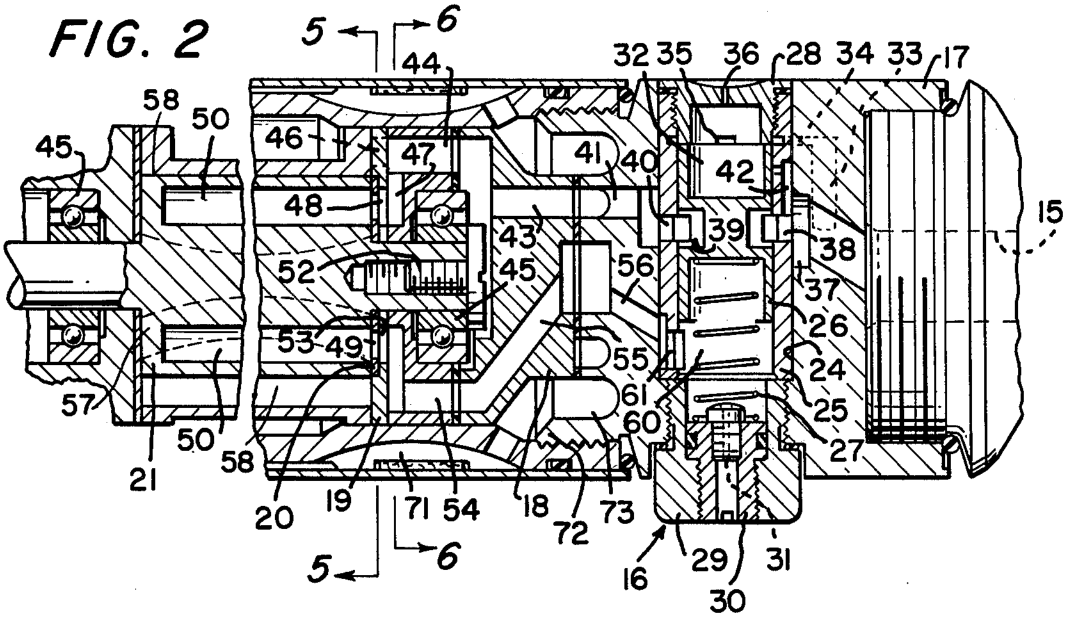
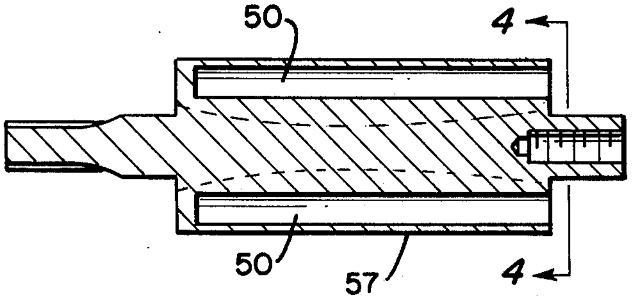
FIG. 3
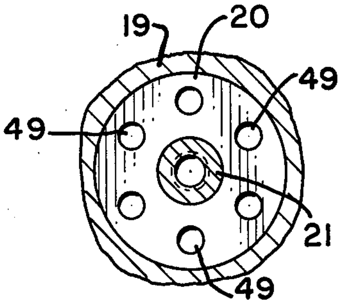
FIG. 5
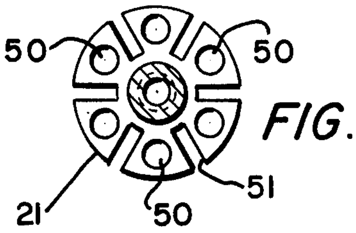
FIG. 4
FIG. 6
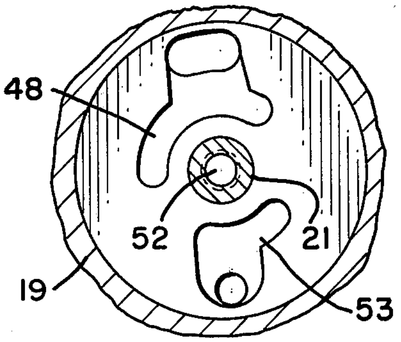

AIR SHUT-OFF TOOL

BACKGROUND OF THE INVENTION

In a conventional air-operated power tool such as an angle wrench, air enters by means of a hose which is connected to the plant air supply and through a simple throttle or control valve. The air enters a rotary vane motor and causes the rotor of that motor to rotate. It is a characteristic of rotary vane motors to operate at high speed and low torque. Therefore, the output shaft of the motor in an angle wrench is usually connected to one or more planetary gear sets for the purpose of multiplying the torque and reducing the speed. In turn, the output shaft of the planetary gear set is connected to a right angle gear set, the output of which has a square drive which can be used to mount a socket for driving a fastener.

In some assembly operations, it is desirable to provide a means for shutting the tool off automatically when a preset torque is reached. The apparatus described in the preferred embodiment of this invention is such a device. It is intended to sense when the air motor rotor is approaching stall and shut off the air supply to the motor. By varying the supply air pressure, gear ratio, and motor size, any torque can be produced. Assuming the air supply pressure can be maintaining at a reasonably constant level, the output for shut-off torque may be controlled within suitable limits for many assembly fastener applications.

SUMMARY OF THE INVENTION

The object of this invention is to provide an air-operated power tool of the conventional angle wrench type which is capable of sensing approaching stall and shutting off the motor in response thereto. It is a further object of this invention to sense the impending stall condition by means of a pneumatic device as opposed to a mechanical device such as a centrifugal governor. It is still a further object of this invention to provide a pneumatic device which senses approaching motor stall by creating a pressure signal by mass transfer of a small quantity of pressure fluid in proportion to the speed of the motor rotor but independent of the pressure fluid expanded to operate the motor. It is an object of this invention to teach a means for accomplishing the mass transfer of a small quantity of pressure fluid by utilizing cavities within the motor rotor as a pump or transfer means.

It is also an object of this invention to teach a means of communicating pressure fluid with a pressure responsive shut-off valve and a pump means to accomplish power tool shut-off. These and other object may be accomplished in a fluid-operated power tool comprising: A fluid operated motor; a housing to contain the motor, the housing having a passageway for supplying fluid under pressure to the motor; a shut-off valve for establishing open and closed fluid flow conditions in the passageway; a pressure differential operated valve in the passageway between the motor and the shut-off valve for interrupting the flow of fluid in response to a pressure differential signal; means for creating a pressure differential signal in response to the rotation of the motor by mass transfer of a quantity of pressure fluid proportional to motor speed and independent of the fluid expanded in driving the motor.

BRIEF DESCRIPTION OF THE DRAWINGS

FIG. 1 shows a side elevation view of an air-operated angle wrench of a type which may incorporate this invention.

FIG. 2 is a sectional elevation of a power tool of this invention showing the essential elements of the invention.

FIG. 3 is a sectional elevation of the air motor rotor showing the air transfer cavities.

FIG. 4 is an end elevation view of the rotor of this invention taken at section 4—4 of FIG. 3.

FIG. 5 is an elevation view of the sealing plate taken at section 5—5 on FIG. 2.

FIG. 6 is an elevation view of the air distribution plate taken at section 6—6 of FIG. 2.

DESCRIPTION OF THE PREFERRED EMBODIMENT

FIG. 1 shows an air-operated angle wrench 10 having an air inlet 11, a manual on-off valve operating lever 12, an angle head 13, and an output square drive 14. In FIG. 2, air enters the air inlet coupling 11 to the right (shown in FIG. 1) and proceeds to the manual on-off operating valve (not shown) and then proceeds via air inlet passageway 15 to the rotation responsive shut-off device of this invention. The rotation responsive shut-off device comprises a pressure responsive shut-off valve 16, a valve housing 17, a distribution cone 18, an air distribution plate 19, a sealing plate 20, and an air motor 21 having a rotor 57 and a plurality of vanes 58.

Taking each component in order, the pressure reponsive shut-off valve 16 is a pressure differential responsive spool valve which is located in the valve housing 17 portion of the angle wrench near the handle as shown in FIG. 1. A bore 24 in the valve housing 17 forms the outer casing of the pressure responsive shut-off valve. Located within the bore 24 are a sleeve 25, a spool 26, a spring 27, a sealing cap 28, a plug 29, an orifice and adjustable spring seat bushing 30, and an orifice 31. Air is supplied to the upper chamber 32 formed between spool 26 and sealing cap 28 by means of air passageway 33, air passageway 34, and inlet ports 35. Air is also exhausted from air passageway 34 by means of a vent 36.

It can be seen that once air or pressure fluid has been admitted to air inlet passageway 15 that a pressure will be established in the upper chamber 32 which will be somewhere between the pressure of the incoming pressure fluid and atmosphere as controlled by the relative size of an orifice (not shown) which restricts the air to inlet passageway 33 and 34 and the vent 36.

When the spool 26 is in the position shown in FIG. 2, air enters the spool valve bore 24 via ports 37 in the valve housing, port 38 in the sleeve 25 and passes around the spool 26 in a circumferential slot 39. The inlet air is then permitted to exit the spool valve via exit port 40 in sleeve 25, and passageway 41 in the valve housing 17.

A secondary air inlet passageway 42 communicates from the port 37 to the spool 26. However, with the position of the spool shown in FIG. 2, the secondary air inlet passageway is blocked off by the spool. The secondary air inlet passageway 42 contributes a supply of pressure fluid to the upper chamber once the spool begins to move towards a lower position therefore assisting the spool to move more rapidly. It should be understood by one skilled in the art that abovedescribed system of passageways allow air to be supplied to the remainder of the system and forms a means of pressuring a first or upper side of a spool valve.

Continuing on with the air supply side of the system, air continues along passageway 43 in the distribution cone 18, and passageway 44 formed around the air motor rotor mounting bearing 45. At this point, air is distributed via motor port 46 to the air motor to be expanded in causing the air motor to rotate. Air is also distributed by means of passageway 47 and air distribution port 48 in air distribution plate 19 through ports 49 in sealing plate 20, and finally into air transfer cavities 50.

The air which enters the motor and expanded in causing the motor to rotate exits the motor by a series of passageways 71 in the motor case 72 around the air distribution cone, passageway 73 in the valve housing 17, and finally by a series of peripheral passageway (not shown) back towards the handle of the angle wrench where it is exhausted or piped away.

Returning now to the air which enters transfer cavities 50: As can be seen in FIG. 3, the air transfer cavities are formed in air motor rotor 57. They are essentially drilled cavities formed between the rotor vane slots 51 (best seen on FIG. 4). Sealing plate 20 is attached to and rotates with the rotor 21. The ports 49 of sealing plate 20 are in register with the air transfer cavities 50 in the motor rotor. The sealing plate prevents air intended for transfer in the air transfer cavities 50 from being dissipated in the vane slots 51. Air distribution plate 19 is maintained in close contact with sealing plate 20 by means of an end plate adjusting screw 52. A close slide fit is maintained to prevent bypass of air charged into the air transfer cavities by means of the air distribution port 48.

As shown in FIG. 6, the shape of the air distribution port is chosen so that it may charge the air transfer cavities for a considerable portion of the rotor rotation, thus allowing time for the air transfer cavities to be substantially charged with pressure fluid. The pressure fluid is transported by the air transfer cavities as the rotor of the air motor rotates until the air transfer cavities register with air receiving port 53 in air distribution plate 19 as shown in FIG. 6.

The air or pressure fluid entering air receiving port 53 is transmitted by passageway 54 around the mounting bearing 45 through passageway 55 in air distribution cone 18 and passageway 56 in the valve housing 17. The transferred pressure fluid next enters the lower chamber 60 of the pressure responsive shut-off valve 16 via a port 61 in the sleeve 25. Lower chamber 60 is formed in bore 24 by sleeve 25, spool 26, plug 29, orifice bushing 30, and orifice 31.

The pressure in the lower chamber 60 is controlled by the transferred pressure fluid entering the chamber and the pressure bleed provide by orifice 31. It can be appreciated by one skilled in the art that the pressure in the lower chamber 60 will, therefore, be somewhere between the pressure of the transferred pressure fluid and atmospheric pressure.

As can be seen in FIG. 2, the construction of the angle wrench is accomplished by assembly of the various components primarily be means of threaded connections. Gaskets and "O" rings are utilized to seal the various members and passageways within members and it will not be described in detail since this construction in conventional. Applicants have avoided the excessive and possibly confusing description of the assembly other than those components necessary to understand the working of their invention.

The operation of the invention may best be understood by referring to FIG. 2. The spool 26 is biased to the normally opened position shown in FIG. 2 by means of spring 27. When the force resulting from the pressure in the upper chamber 32 exceeds the force resulting from the pressure in the lower chamber 60 plus the force of the spring 27, spool 26 will be moved in the direction of the lower chamber. In rapid succession the secondary air inlet passage 42 will be opened to the upper chamber and thereby allow a rapid pressure increase to occur in the upper chamber to propel the spool 26 towards the lower chamber. As can be seen in FIG. 2, once the spool has moved sufficiently downward to close off port 38, the flow of pressure fluid will cease to the motor.

In operation, pressure fluid is admitted to air inlet passageway 15 by depressing operating lever 12 which opens the manual on-off operating valve. The pressure fluid will proceed via port 37, through port 38 around circumferential slot 39, through exit port 40, passages 41, 43, and 44, and finally via motor port 46 to the air motor where it is expanded to drive against the vanes of the air motor, therefore, causing it to rotate. Pressure fluid which is expanded to drive the motor exhausts the motor housing via passages 71, 72, and 73 and finally to the handle 23 where it is exhausted to atmosphere or piped away if sound reduction is desirable. During this process, pressure fluid also enters the upper chamber 32 by means of air passageway 33 and air passage 34 through inlet port 35. The volume of upper chamber 32 and passageways 33 and 34 delays rapid pressure build up in the chamber as controlled by the relative size of the orifice inlet to air passage 33 and vent 36. The time delay in pressure build up is chosen such that the motor is permitted to rotate substantially prior to a sufficient build up in the upper pressure chamber to cause the spool to be displaced towards the lower chamber. This prevents a premature shut off of the motor as it accelerates on starting.

As the motor rotates, a quantity of pressure fluid is charged into air transfer cavities 50 via passageway 47, air distribution port 48, and through the port 49 in sealing plate 20. Once the cavities have been charged and rotated passed air distribution port 48, the clearance between air distribution plate 19 and sealing plate 20 is such that the pressure fluid is retained by the air transfer cavities 50 until the air transfer cavities pass air receiving port 53. At this time the air transfer cavities discharge a portion of the pressure fluid which via passageways 53, 54, 55, and 56, and through port 61 enter lower chamber 60.

It will be appreciated by one skilled in the art that the faster the motor rotates the greater the quantity of pressure fluid that will be transferred to the lower chamber. At the relatively high starting or rundown speed in a typical angle wrench operation, the pressure build up in lower chamber 60 will be quite rapid. The extent of pressure build up is controlled by the amount of pressure fluid bleed allowed through orifice 31. It will be appreciated by one skilled in the art that as the fastener is driven home and the torque required to turn the fastener increases the speed of the motor decreases and therefore the amount of pressure fluid transferred in the air transfer cavities to the lower chamber decreases. As the quantity of pressure fluid transferred decreases the pressure in lower chamber 60 also decreases as a result of the quantity of fluid lost through the orifice 31 to atmosphere.

Since the pressure in the upper chamber will remain relatively constant during the period of time that the motor is running, it will be appreciated that the pressure on the top of the spool will become relatively greater than the pressure below the spool as the motor slows down. By careful selection of the venting rate through orifice 31 and selection and adjustment of the spring 37, it will therefore by appreciated that the rotor speed at which the relative pressure force in the upper chamber exceeds the pressure force in the lower chamber plus the force of the spring causing the spool to move towards the lower chamber may be controlled.

Once the spool has moved sufficiently to open the secondary air inlet passage 42 to the upper chamber, the pressure in the upper chamber will increase substantially, therefore, contributing to a more rapid transfer of the spool 26 towards the lower chamber. Once the spool 26 has been displaced sufficiently towards the lower chamber, its side walls will block off port 38 and thereby prevent further pressure fluid flow to the motor and rotational output will cease. The spool 26 will remain in the shut-off position as long as the manual on-off valve is open.

To reset the pressure responsive shut-off valve 16 for subsequent operation, it is necessary to release the operating lever 12 and thereby close the manual operating valve. Pressure in the upper chamber will then bleed off via the vent 36, and the spring 27 will return the spool to the open position whereupon the operating cycle may be repeated. If the manual operating valve is depressed while the wrench is under full torgue load, the pressure in the upper chamber will build up and since there will be no rotation of the motor rotor, the pressure in the lower chamber will not increase and the pressure responsive shut-off valve will fire to its closed position thereby indicating to the operator that the appropriate torque load has already been applied to the fastener.

It should be obvious to one skilled in the art that numerous means of transferring pressure fluid from the inlet to the transferred fluid receiving chamber may be employed. Applicants do not wish to limit the scope of their invention to the preferred embodiment. It should be understood that the scope of applicants' invention is intended to be limited only by the scope of the claims.

We claim:

1. A pressure fluid operated tool comprising:

a pressure fluid rotary motor operating a tool;

a housing to contain said motor, said housing having a passageway for supplying pressure fluid under pressure to said motor;

a shut-off valve for establishing open and closed fluid flow conditions in said passageway;

a pressure differential operated valve in said passageway between said motor and said shut-off valve for interrupting the flow of fluid in response to a pressure differential, said pressure differential operated valve communicating on one side with said passageway; and means for transferring discrete quantities of pressure fluid in sequence from said passageway proportional to motor speed and independent of the fluid expanded in driving said motor and creating a pressure signal thereby and applying said pressure signal to the other side of said pressure differential operated valve to operate said pressure differential operated valve to shut off said motor.

2. The pressure fluid operated tool of claim 1 wherein:

the pressure fluid is air and said pressure fluid operated motor is a vane type air motor having a rotor and radially extensible vanes.

3. The pressure fluid operated tool of claim 1 wherein:

said pressure differential operated valve is a pressure biased spool valve having a first side of the spool communicating with the pressure fluid supply and a second side of the spool communicating with a chamber receiving quantities of pressure fluid transferred in response to the rotation of said fluid operated motor and a calibrated vent to atmosphere; and said spool valve responding to shut off said flow of pressure fluid to said motor in response to a reduced transfer of pressure fluid proportional to motor speed after a normal speed is established.

4. The pressure fluid operated tool of claim 3 wherein:

said pressure biased spool valve has a spring for biasing it towards said first side of the spool.

5. The pressure fluid operated tool of claim 2 wherein:

said means for creating a pressure signal in response to the rotation of said motor is a pressure fluid receiving means rotating with the motor, said pressure fluid receiving means receiving pressure fluid in proportion to motor speed.

6. The pressure fluid operated tool of claim 5 wherein:

said pressure fluid receiving means is a plurality of cavities formed in the rotor of said vane type air motor.

7. The pressure fluid operated tool of claim 6 wherein:

said cavities are isolated by sealing plate means from the vanes of said motor rotor.

8. The pressure fluid operated tool of claim 6 wherein:

said plurality of cavities are supplied pressure fluid by a distribution plate means for allowing said cavities to be supplied pressure fluid for a substantial portion of the rotor seqment to assure rapid pressure fluid transfer during high speed rotation of said rotor.

* * * * *